United States Patent [19]

Rogers

[11] Patent Number: 4,969,567
[45] Date of Patent: Nov. 13, 1990

[54] COLLAPSIBLE CHEESE BOX

[75] Inventor: Ronald J. Rogers, Fredericksburg, Iowa

[73] Assignee: Vacu-Purg, Inc., Fredericksburg, Iowa

[21] Appl. No.: 263,888

[22] Filed: Oct. 28, 1988

[51] Int. Cl.$^5$ ............................................. B65D 27/00
[52] U.S. Cl. .................................... 220/4 F; 217/12 Q
[58] Field of Search ..................... 220/4 F, 4 R, 70.1; 217/12 R, 13, 45

[56] References Cited

U.S. PATENT DOCUMENTS

| 1,045,412 | 11/1912 | Kling | 217/12 R |
| 3,477,604 | 11/1969 | Kridle | 217/12 R |
| 4,809,851 | 3/1989 | Oestreich | 220/4 F |

FOREIGN PATENT DOCUMENTS 192847  12/1956  Austria .............................. 217/12 R Primary Examiner—Steven M. Pollard
Attorney, Agent, or Firm—Zarley McKee, Thomte, Voorhees & Sease

[57] ABSTRACT

A stainless steel cheese box includes a bottom frame having an upstanding peripheral flange positioned outwardly of opposite end and side walls. A bottom wall of polyurethane material of substantial thickness temporarily holds the end and side walls erect while the box is being assembled. A top frame fits down over the top ends of the end and side walls and holds a top polyurethane wall in place on top of the cheese. Locking straps extend between the top and bottom frames to lock the component parts together.

8 Claims, 3 Drawing Sheets

U.S. Patent  Nov. 13, 1990  Sheet 1 of 3  4,969,567
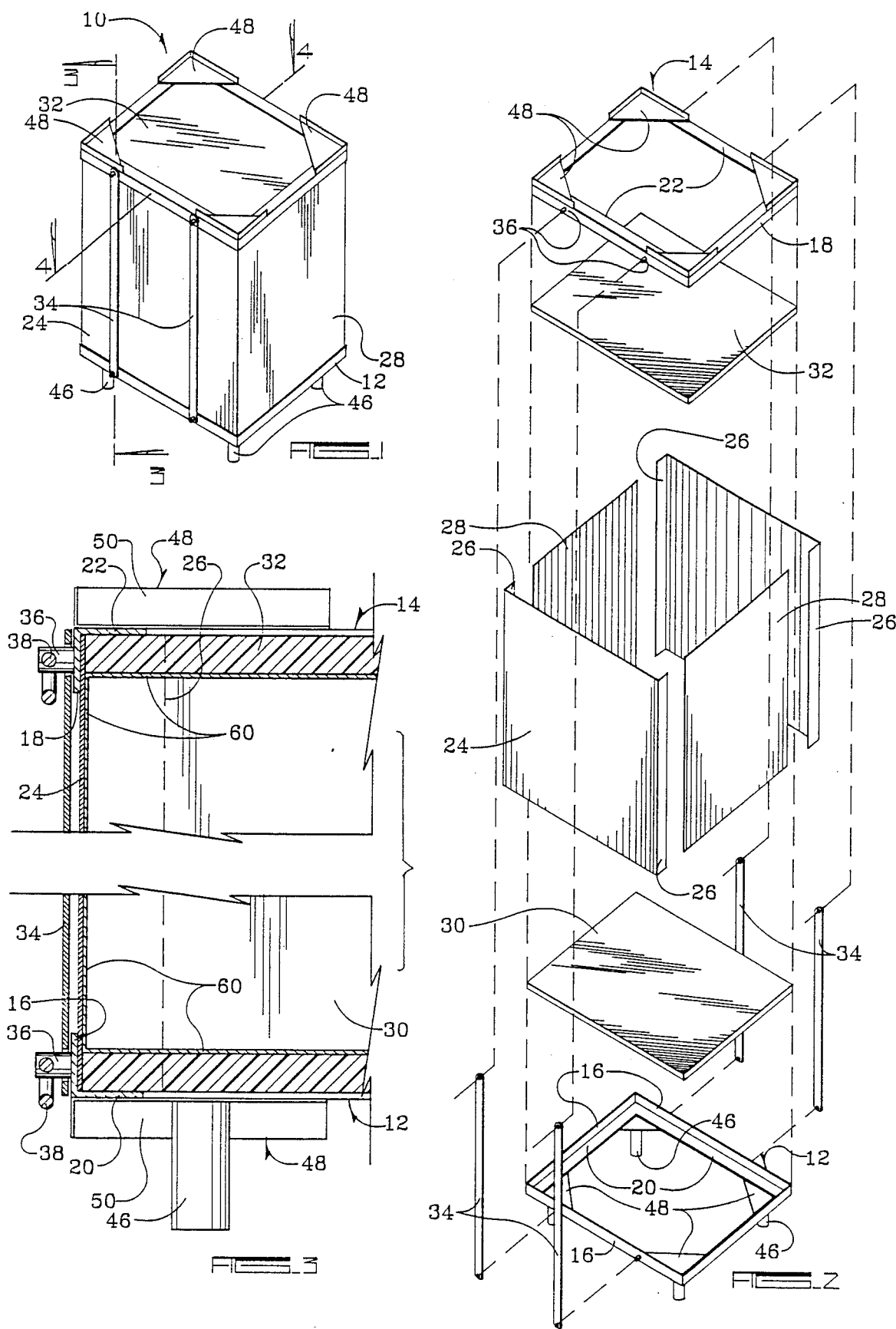

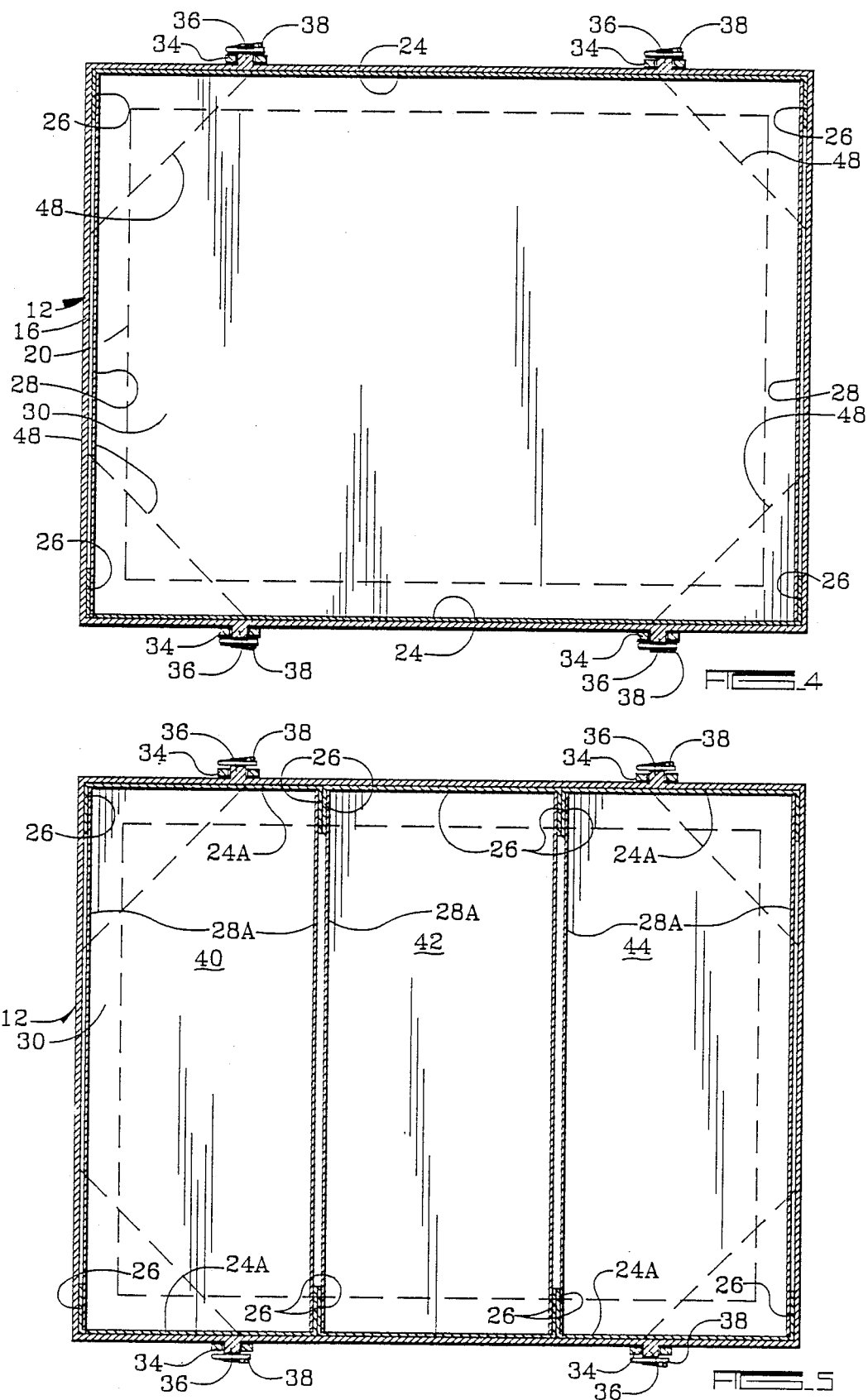

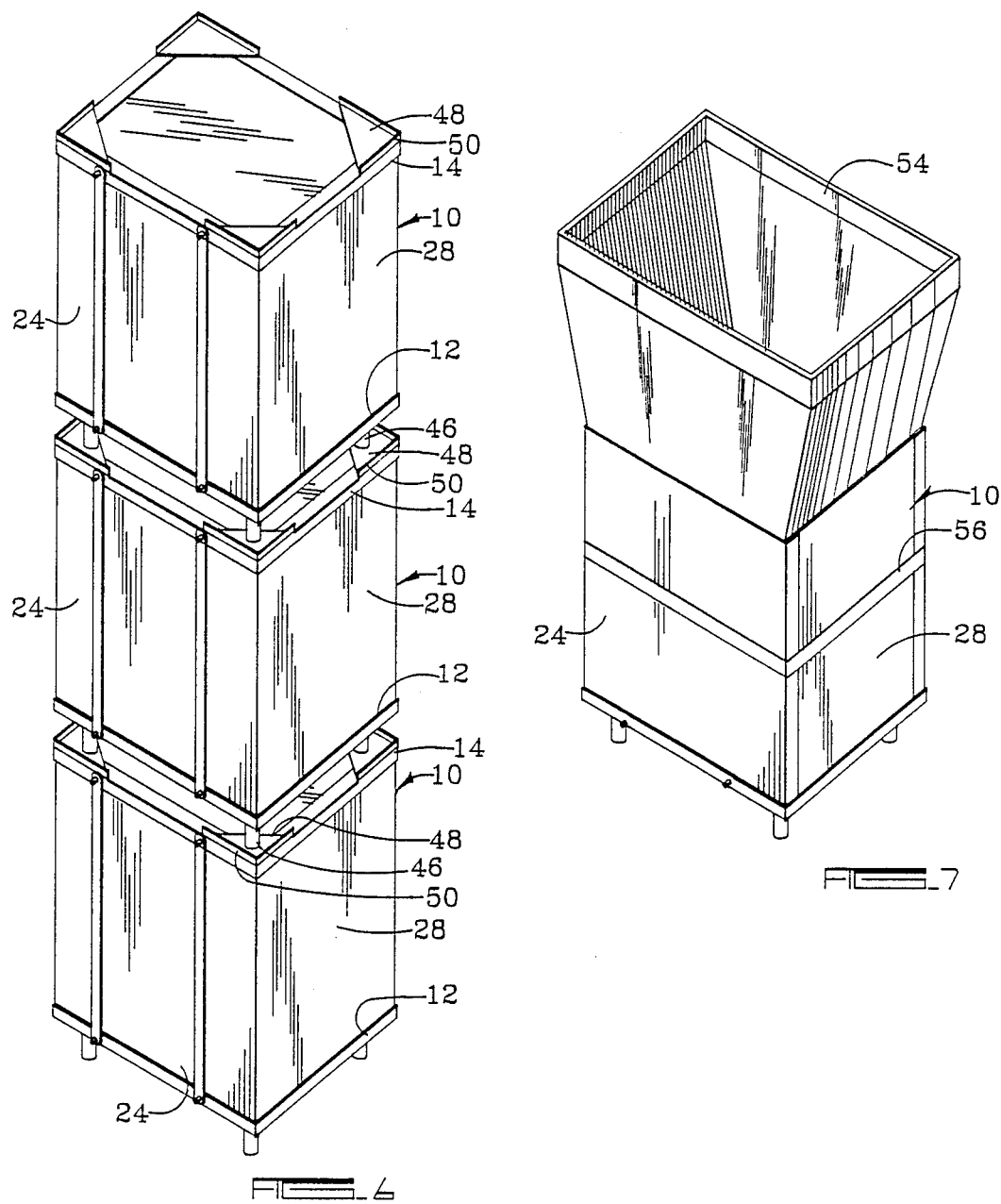

4,969,567

COLLAPSIBLE CHEESE BOX

BACKGROUND OF THE INVENTION

Cheese boxes currently being used are made substantially from plywood and are difficult to clean and awkward to work with during filling and shipping. Wood is also a poor conductor of heat as compared to metal during the cheese manufacturing process, thereby requiring more time for cooling.

SUMMARY OF THE INVENTION

The cheese box of this invention may be quickly assembled and disassembled as well as be easily cleaned. The box includes a bottom frame having an upstanding peripheral flange which supports a bottom wall having a substantial thickness. The end and side walls are positioned around the thick bottom wall inside the bottom frame flange whereby the end and side walls will stand on their own while the box is being assembled. During the filling of the box an endless strap is placed around the end and side walls and a funnel is placed in the top for filling the box. Upon the box being filled, a top frame having a downwardly extending peripheral flange is placed over a top wall and the top ends of the end and side walls. Strap members are then placed on the sides of the box releasably connecting the top and bottom frames such that the box may be shipped as a unitary container. Legs are provided on the bottom frame which are in alignment with corner support plates on the top frame for stacking a series of boxes.

DESCRIPTION OF THE DRAWINGS

FIG. 1 is a perspective view of the collapsible cheese box of this invention.

FIG. 2 is an exploded perspective view thereof.

FIG. 3 is a cross-sectional view taken along line 3—3 in FIG. 1.

FIG. 4 is a cross-sectional view taken along line 4—4 in FIG. 1.

FIG. 5 is a cross-sectional view similar to FIG. 4 but showing a plurality of boxes assembled between the top and bottom frames.

FIG. 6 is a perspective view similar to FIG. 1 showing a plurality of boxes in vertical stacked relationship.

FIG. 7 is a perspective view of a cheese box having the funnel in the top open end during the filling operation.

DESCRIPTION OF THE PREFERRED EMBODIMENT

The cheese box of this invention is referred to generally in FIG. 1 by the reference numeral 10 and is shown in FIG. 2 to include a bottom frame 12 and a top frame 14. Each of the frames has oppositely disposed peripheral flanges 16 and 18 respectively. Inwardly extending horizontal flanges 20 and 22 are also provided.

A pair of end walls 24 are provided with oppositely extending side flanges 26 which are adapted to be positioned on the outside of side wall 28. End walls 24 and side walls 28 are then positioned inside the upstanding peripheral flange 16 of the bottom frame 12. A bottom wall 30 of polyurethane foam of substantial thickness is positioned on the bottom frame 12, peripheral flange 20, and inside the walls 24 and 28, thereby holding the walls erect while the box is being assembled.

A top wall 32 also of polyurethane material is positioned against the horizontal flanges 22 of the top frame 14 and inside the end walls 24 and side walls 28. The top frame 14 extends down over the top ends of the end walls 24 and side walls 28. A pair of side straps 34 are provided to extend along the end walls 24 on opposite sides of the box and engage outwardly extending pins 36 on the top and bottom frames 12 and 14 to releasably lock the box in an assembled condition for shipment. Removable retainer locking rings 38 extend through the pins 36 on the outside of the straps 34 to hold the straps in place.

As seen in FIG. 5, three separate cheese boxes 40, 42, and 44, are provided between the bottom and top frames 12 and 14. Each box includes its own end walls 24A and side walls 28A.

In FIG. 6, three cheese boxes 10 are shown in stacked relationship for shipment and storage purposes. The bottom frame 12 includes legs 46 which rest upon corner support plates 48 in the top frame 14. The plates 48 include upwardly extending peripheral flanges 50 to retain the legs 46 on the plates 48.

The filling of the cheese box 10 is shown in FIG. 7 where a funnel 54 is positioned in the open upper end of the box in mating engagement with the end walls 24 and side walls 28 to thereby assure that the box is fully filled and to prevent inward movement of the walls during the filling operation. A strap 56 such as rubber band extends around the middle of the box to prevent the walls 24 and 28 from pushing outwardly during the filling operation. Upon completion of the filling of the box, the funnel 54 is removed and the top wall 32 and top frame 14 are put in place followed by the strap members 34 being positioned on the pins 36 to lock the top and bottom frames 12 and respectively together, thereby providing a unitary box ready for shipment. A plastic liner 60 extends around the interior of the walls 24, 28, 30 and 32.

It is thus seen that the cheese box of this invention may be easily assembled, filled with cheese, shipped and then disassembled. Component parts may also be easily cleaned in preparation of being reassembled for further use. A typical cheese box will have a length and height of 28" and depth of 22" for American cheese or it will measure 22"×28" for mozzarella cheese. A container will hold 640 pounds of cheese. The boxes may be stacked 4 and 5 high.

What is claimed is:

1. A collapsible cheese box comprising:
   top and bottom frames having peripheral flanges extending towards each other, said frames having opposite sides and ends,
   oppositely disposed end and side walls positioned in and extending between said top and bottom frames on the inside of said flanges,
   top and bottom walls positioned in said top and bottom frames inside said flanges,
   locking means being operable to limit outward movement of said top and bottom frames thereby holding said box together as a unitary structure or allowing for its disassembly, said locking means including said top and bottom frame flanges at opposite sides or opposite ends having outwardly extending pins and strap members having openings at opposite ends being connected to said top and bottom frame flanges at said opposite sides or ends by said pins being received in said openings, and retainer means engaging said pins outwardly of said strap members to hold said strap members on said pins.

2. The structure of claim 1 wherein one of said oppositely disposed end or side walls includes flanges extending towards each other with the other of said end or side walls being disposed on the inside of said flanges thereby limiting outward movement thereof.

3. The structure of claim 2 wherein said bottom wall has substantial thickness thereby sandwiching said opposite end and side walls between said bottom frame flanges and said bottom wall to maintain said opposite end and side walls upstanding prior to said top frame being put in place.

4. The structure of claim 2 wherein said top and bottom frames are further defined as including horizontally disposed flanges disposed on the outside of said top and bottom walls and extending perpendicular to said peripheral flanges.

5. The structure of claim 4 wherein said top and bottom frames are substantially open inwardly of said horizontal flanges.

6. The structure of claim 5 wherein support plates are provided at the corners of said top frame to receive and support legs on the bottom frame at each corner thereof whereby said boxes may be stacked.

7. The structure of claim 4 wherein said top and bottom frames, said end and side walls are made of stainless steel material and said top and bottom walls are made of plastic material.

8. The structure of claim 2 wherein said top and bottom frames include a plurality of oppositely disposed end and side walls and top and bottom walls assembled between said top and bottom frames to provide a plurality of boxes disposed in side-by-side relationship between said top and bottom frames.

* * * * *